Patented Sept. 4, 1945

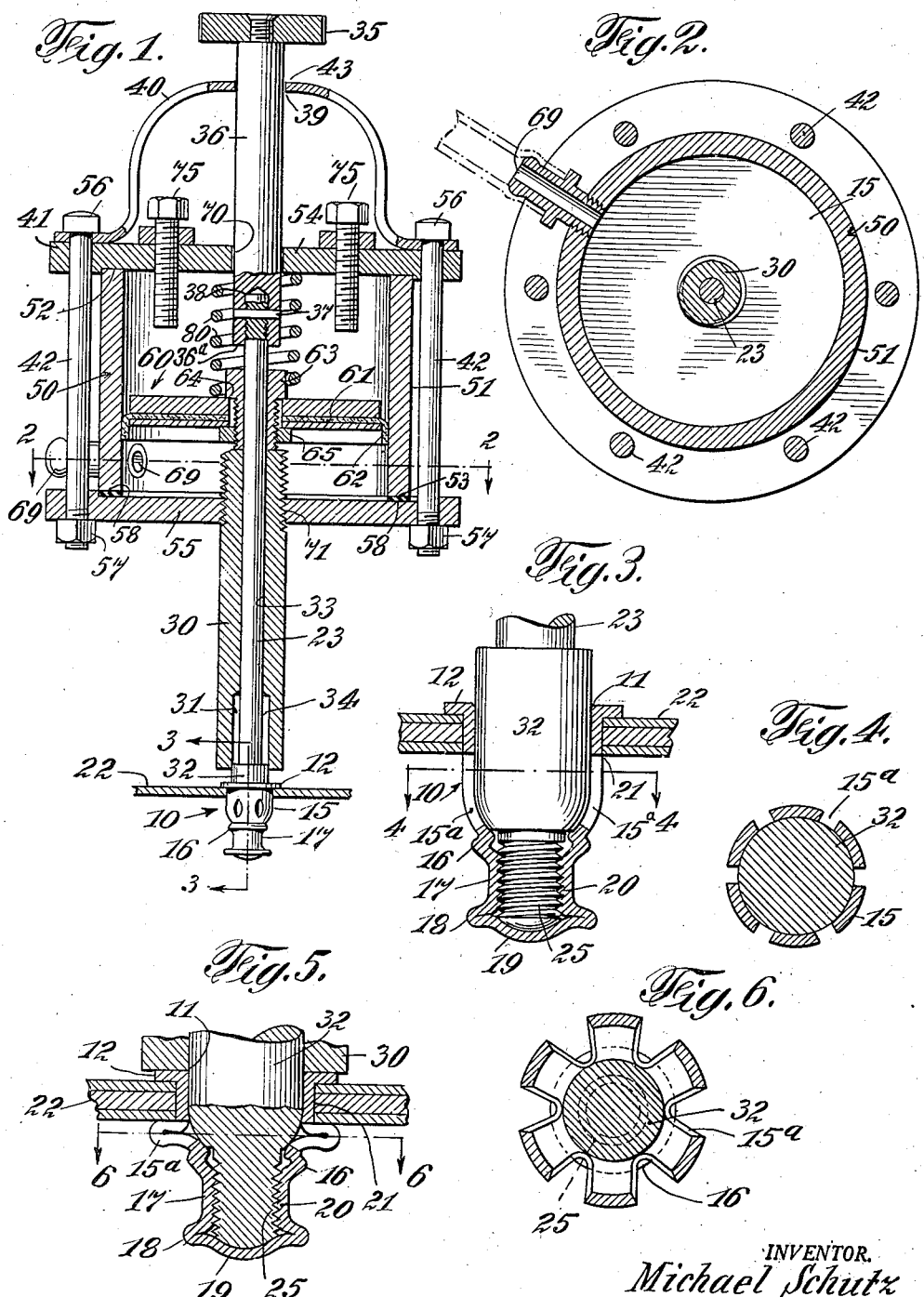

2,384,347

UNITED STATES PATENT OFFICE 2,384,347

CAGE NUT TOOL

Michael Schutz, Jackson Heights, N. Y., assignor to Steinway & Sons, New York, N. Y., a corporation of New York Application November 11, 1943, Serial No. 509,825

1 Claim. (Cl. 218—19)

This invention relates to tools for clinching cage nuts to plywood skins used in glider or aeroplane constructions.

This invention has for its object to provide a tool which will be quick in action, and provide a snap clinching action and securely fasten the cagenut to the plywood skin.

The invention consists of a shaft having a screw-threaded end engaging the interior of a cage nut, and means for moving said shaft to collapse the cage nut, a holder for the shaft being provided which abuts against the cage nut rim, for clinching the cage nut against a plywood skin. The shaft is axially moved by a piston operated by compressed air, and the shaft has a means for rotating it arranged on the other end of the casing for the piston. The said means, shaft, support and casing are all co-axial.

The invention will be further described in connection with the embodiments shown, and will be finally pointed out in the claim.

In the accompanying drawing,

Fig. 1 is a central section of my improved tool;

Fig. 2 is a transverse section on line 2—2 of Figure 1;

Fig. 3 is an enlarged longitudinal section of the cage nut engaged by the threaded end of the plunger shaft;

Fig. 4 is a transverse section on line 4—4 of Fig. 3;

Fig. 5 is a longitudinal section of the cage nut in clinched position, and

Fig. 6 is a transverse section on line 6—6 of Fig. 5.

Similar characters of reference indicate corresponding parts throughout the various views.

Referring to the drawing, and more particularly to Figure 3, the cage nut as known consists of a cup-shaped portion 10 opening into its mouth 11 where the rim 12 of the cup is formed by a circumferential flange substantially at right angles to the axis of the cup.

The cup-shaped body 10 has an extension with slots 15a, consisting of an outwardly extending shoulder 16, an inwardly curved part 17, an outwardly extending shoulder 18 and a covering end portion 19. The inwardly extending curved portion 17 has at its interior surface a screw-threaded portion 20. Cage nuts of this kind are passed through openings in the plywood skin, one of which openings is shown by 21 in the plywood 22. The interior circumferential rim of the opening 21 is substantially equal to the exterior circumferential portion of the cup-shaped body 10 adjacent its rim 12, so that the cage nut sits snugly in the opening, being supported by the plywood 22, with the rim 12 resting on the plywood.

The invention consists in providing a movable shaft 23 at its end with an externally threaded portion 25 of the same pitch as the internal threads of the portion 20, to enable an engagement therebetween. The shaft 23 is intended upon said screw-threaded engagement to have its tip end engage the inner surface of the end portion 19. When the threads are engaged and the tip of the shaft in contact with the end of the cage nut, the shaft has its exterior portion snugly fitted into the interior of the cup portion, the shaft end being so formed for this purpose. With the parts so engaged the cage nut is ready for the clinching operation.

This is carried out by subjecting the rim 12 to a resisting or holding action against a pulling action of the shaft 23. This is carried out by pressing the holder 30 against the rim 21 and subjecting the shaft 23 to a movement in the opposite direction to the holding force. This pulls the threaded portion of the cage nut and collapses or clinches the cup or skirt 10 to the extent necessary to complete the clinging operation, whereupon the cage nut is capable of being used for its intended purpose, the shaft then being unscrewed to release or remove the shaft entirely from the cage nut.

In Figure 1, the holder 30 consists of a sleeve which has a bore 31 for the seating of the enlarged portion 32 of the shaft 23. A subcaliber bore 33 in the sleeve permits free movement of the shank 34 of the shaft 23 which extends upwardly until its other end extends out of the sleeve, where it is keyed to an extended shaft portion 36 which has, at its uppermost end, a knurled button 35. In the embodiment shown, the shaft 23 is secured at its upper end to the extended shaft portion 36, by a key 37 which preferably passes through the shaft 23. The extended shaft portion forms a shoulder 36a in the path of the hub 63. The shaft 23 and extended shaft portion 36 act as one member longitudinally and rotatably. The end of the shaft has a screw-threaded portion engaging a screw-threaded bore 38, and the extended shaft portion 36 is freely guided at 43 without friction by a handle opening 39 of a handle 40, secured to a casing 41 by bolts 42. By turning the knob 35 at one end of the shaft, the shaft is rotated until its other end has its screw-threads engage the screw-threads of the cage nut to the limit of the movement into the cage nut.

The casing 50 consists of a cylindrical portion 51 having its open ends 52 and 53 closed by discs 54 and 55, with the discs held towards each other by bolts 42 having heads 56 and nuts 57. A suitable number of such bolts are provided. When the nuts are screwed on sufficiently, the interior of the casing is liquid tight, a rubber or the like sheet 58 being provided. Within the casing 50 a piston 60 is arranged which is provided with rubber or the like sheets 61, having guiding and sealing lips 62, which move along the interior of the cylinder 51. The piston 60 has a central opening through which a hub 63, having a shoulder 64, passes and which hub 63 has a screw threaded portion, which is engaged by a screw threaded nut 65. The piston 60 is held between the shoulder 64 of the hub 63 and the nut 65; and on the movement of the piston 60 the hub moves with it. Normally the hub 63 rests upon the stationary holder 30. The shaft 23 is freely rotatable in the bore of the hub 63. A spring 80 is disposed between the upper end of the casing and the piston 60 to return the piston to its initial position as shown in Fig. 1. The movement of the piston 60 results from the action of compressed air entering the cylinder 51 at the air inlet nozzle 69, to which a hose is connected, and which hose is connected with a source of compressed air, and the upward movement of the piston 60 overcomes the action of the spring 80.

The upper disc 54 has a central opening 70 for the passage of the shaft portion 36. The bottom disc 55 has a central opening 71 which has its walls screw-threaded to engage external screw-threads of the sleeve or holder 30. Adjusting screws 75 to limit the movement of the piston 60, pass through the upper disc 54.

After the shaft has been screwed to the cage nut, the sleeve or holder 30 is pressed against the rim 12, to hold it, and then the air is caused to enter the cylinder, and the shaft is pulled against the holding force of the holder until the cage nut is clinched, when the air is stopped, and the piston returns to its initial position. Suitable control valves for the air inlet and outlet, as known, are provided. Figure 1 shows the piston in its initial position; and the holder just ready to abut against the rim, and when the shaft pulls upwardly it has its enlarged end 32 enter the bore 31.

It will be noted that the shaft 23 is co-axial with the piston and with the extension 36, on which the nut or handle 35 is secured. This makes a very simple structure having ease in operation, in that the shaft is screwed in, the piston operated, and the shaft unscrewed.

From the foregoing it is believed that the operation and advantages of the invention will be readily understood by those skilled in the art without further description, it being borne in mind that numerous changes may be made in the details disclosed without departing from the spirit of the invention as set out in the following claim.

What I claim is:

In a tool for cage nuts having a base and a screwthreaded tip and a collapsible portion between the same, such tool having a casing with an upper and lower end, a shaft centrally disposed in the casing and passing through the upper and lower ends of the casing and having a shoulder disposed between said ends, a stationary holder having one end secured to the lower end of the casing and surrounding the lower portion of the shaft and having its other end adapted to engage the base of the cage nut, said shaft being rotatable within the holder and having its end adjacent the cage-nut-engaging-end of the holder screwthreaded for engaging the interior screwthreaded tip of the cage nut, a hub within the casing slidably surrounding the lower portion of said shaft within the casing, a piston within the casing secured to said hub, said casing having an opening below the piston permitting compressed air to enter and to be discharged from the casing, and a spring disposed above the piston and between the piston and the upper end of the casing, the shaft, hub, piston, and holder being axially arranged relative to the casing, whereby upon the piston being raised by the compressed air, the hub strikes the shoulder on the shaft and raises the shaft and collapses the cage nut against the holder, the spring returning the hub and piston to their initial positions upon release of the compressed air below the piston.

MICHAEL SCHUTZ.